US 7,990,415 B2

(12) United States Patent
Matsumoto et al.

(10) Patent No.: US 7,990,415 B2
(45) Date of Patent: Aug. 2, 2011

(54) IMAGE INPUT DEVICE AND CALIBRATION METHOD

(75) Inventors: Kosei Matsumoto, Yokohama (JP); Toshio Moriya, Tokyo (JP); Tsuyoshi Minakawa, Paris (FR)

(73) Assignee: Hitachi, Ltd., Tokyo (JP)

( * ) Notice: Subject to any disclaimer, the term of this patent is extended or adjusted under 35 U.S.C. 154(b) by 1492 days.

(21) Appl. No.: 11/396,641

(22) Filed: Apr. 4, 2006

(65) Prior Publication Data

US 2007/0047940 A1    Mar. 1, 2007

(30) Foreign Application Priority Data

Aug. 30, 2005    (JP) ................................. 2005-249002

(51) Int. Cl.
*H04N 7/18*    (2006.01)

(52) U.S. Cl. ....... 348/136; 348/135; 348/139; 356/4.02; 356/6

(58) Field of Classification Search .................. 348/139, 348/135, 136; 396/139, 140; 356/4.02, 6
See application file for complete search history.

(56) References Cited

U.S. PATENT DOCUMENTS

| | | | | |
|---|---|---|---|---|
| 3,897,150 A | * | 7/1975 | Bridges et al. | 356/5.04 |
| 4,979,815 A | * | 12/1990 | Tsikos | 356/3.06 |
| 5,149,972 A | * | 9/1992 | Fay et al. | 250/461.1 |
| 5,543,889 A | * | 8/1996 | McIntyre | 396/431 |
| 5,889,582 A | * | 3/1999 | Wong et al. | 356/4.01 |

(Continued)

FOREIGN PATENT DOCUMENTS

JP    07-208913    8/1995

(Continued)

OTHER PUBLICATIONS

K. Inaba, et al.; "Calibration of a Vehicle-based Laser/CCD Sensor System for Urban 3D Mapping"; GISdevelopement.net→AARS→ACRS 1999→Measurement and Modeling; Center for Spacial Information Science and Institute of Industrial Science, The University of Tokyo, 4,6,1, Komaba, Merguro-Ku, Tokyo 153-8505. Japan.

*Primary Examiner* — Sinh Tran
*Assistant Examiner* — Paul Berardesca
(74) *Attorney, Agent, or Firm* — Antonelli, Terry, Stout & Kraus, LLP.

(57) ABSTRACT

Provided is an image input device which includes a laser range finder and a camera, and is capable of automatically calibrating the laser range finder and the camera at an appropriate timing without using special equipment. The image input device includes the laser range finder which measures distance information of an object by using invisible light and the camera which measures color information of the object. In order to detect a calibration error between the laser range finder and the camera, an invisible light filter which blocks visible light and transmits invisible light is automatically attached to a lens of the camera by a switching operation between two kinds of lenses. By the camera to which the invisible light filter is being attached, a pattern of the invisible light projected onto the object from the laser range finder is photographed as a visible image. By the comparison between the thus obtained invisible light pattern image and a reference image, the calibration error between the laser range finder and the camera is calculated. When the calibration error exceeds a predetermined value, a relative position and a relative posture between the laser range finder and the camera are automatically calibrated by control of a platform or the like.

6 Claims, 7 Drawing Sheets

U.S. PATENT DOCUMENTS

| | | | |
|---|---|---|---|
| 6,750,899 B1* | 6/2004 | Fishbaine et al. | 348/126 |
| 7,016,411 B2* | 3/2006 | Azuma et al. | 375/240.08 |
| 7,042,491 B2* | 5/2006 | Saito et al. | 348/139 |
| 7,064,776 B2* | 6/2006 | Sumi et al. | 348/169 |
| 7,142,694 B2* | 11/2006 | Hashimoto et al. | 382/106 |
| 7,537,381 B2* | 5/2009 | Hollander et al. | 374/142 |
| 7,541,588 B2* | 6/2009 | Tabirian et al. | 250/341.1 |
| 7,629,995 B2* | 12/2009 | Salivar et al. | 348/143 |
| 7,750,936 B2* | 7/2010 | Provinsal et al. | 348/143 |
| 2003/0189633 A1* | 10/2003 | Allen et al. | 347/246 |
| 2004/0145722 A1* | 7/2004 | Uomori et al. | 356/4.01 |

FOREIGN PATENT DOCUMENTS

| | | |
|---|---|---|
| JP | 2003-315441 | 11/2003 |
| JP | 2004-205398 | 7/2004 |

* cited by examiner

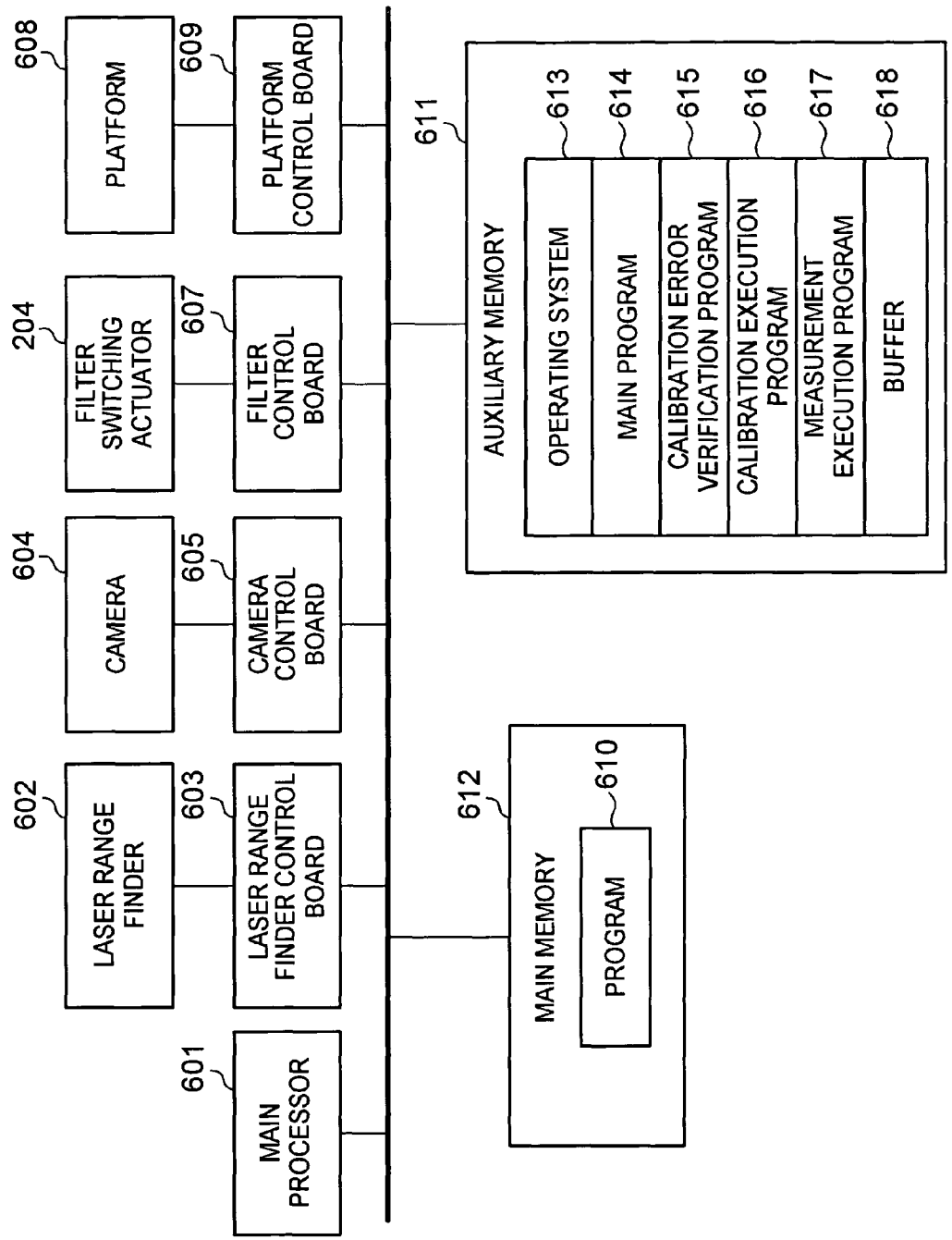

IMAGE INPUT DEVICE AND CALIBRATION METHOD

BACKGROUND OF THE INVENTION

The present invention relates to an image input device capable of measuring distance information and color information independently by using a laser range finder and a camera, and more particularly, to an image input device and a calibration method, which are capable of measuring laser light from a laser range finder by using a camera to calibrate a relative position and a relative posture of the camera with respect to the laser range finder.

Examples of a technique of calibrating a laser range finder and a camera include technologies described in Kazuhisa Inaba, Dinesh Manandhar and Ryosuke Shibasaki, Calibration of a Vehicle-based Laser/CCD Sensor System for Urban 3D Mapping, In Proc of the Asian Conference on Remote Sensing 1999, 1999 (hereinafter, referred to as Non-Patent Document 1) and Japanese Patent Laid-open Publication No. H 7-208913 (hereinafter, referred to as Patent Document 1).

According to Non-Patent Document 1, a target serving as both a laser range finder calibration target and a camera calibration target is measured by a laser range finder and a camera, respectively. Based on results of measurement, a relative position and a relative posture between the laser range finder and the camera are calibrated.

According to Patent Document 1, a change in position of spot light of a laser when a special tool prepared for calibration is moved while being irradiated with the laser light is measured. Based on results of measurement, a relative position and a relative posture between a projector of the laser light and a camera are calculated to manually calibrate the relative position and the relative posture between the projector and the camera.

According to the above-described related art, it is necessary to prepare a special target or a special tool for calibrating the relative position and the relative posture between the laser and the camera.

SUMMARY OF THE INVENTION

It is therefore an object of the present invention to enable an image input device including a laser range finder and a camera to undergo automatic calibration of the laser range finder and the camera at an appropriate timing without using special equipment.

In order to achieve the above object, an image input device according to an aspect of the present invention, includes:

a laser range finder which measures distance information of an object by using invisible light;

a camera which measures color information of the object;

filter attachment means which retains a first filter which blocks visible light and transmits the invisible light, to be attachable to the camera;

calibration error verification means which calculates a calibration error between the laser range finder and the camera by comparison between an image which has a pattern of the invisible light projected from the laser range finder onto the object and is photographed by the camera to which the first filter is being attached, and a reference image; and calibration means which calibrates a relative position and a relative posture between the laser range finder and the camera when the calibration error exceeds a predetermined value.

BRIEF DESCRIPTION OF THE DRAWINGS

In the accompanying drawings:

FIG. 10 is a schematic hardware configuration diagram of the image input device.

DETAILED DESCRIPTION OF THE PREFERRED EMBODIMENT

Hereinafter, an embodiment of the present invention will be described with reference to the accompanying drawings.

First, a configuration of an image input device according to this embodiment will be described. In this embodiment, the configuration exemplarily includes an image input device, which includes a laser range finder capable of measuring a distance to an object and an orientation of the object by using a laser beam having a wavelength out of an area of human visibility as invisible light, and a camera capable of measuring a visible image.

Figure 5:
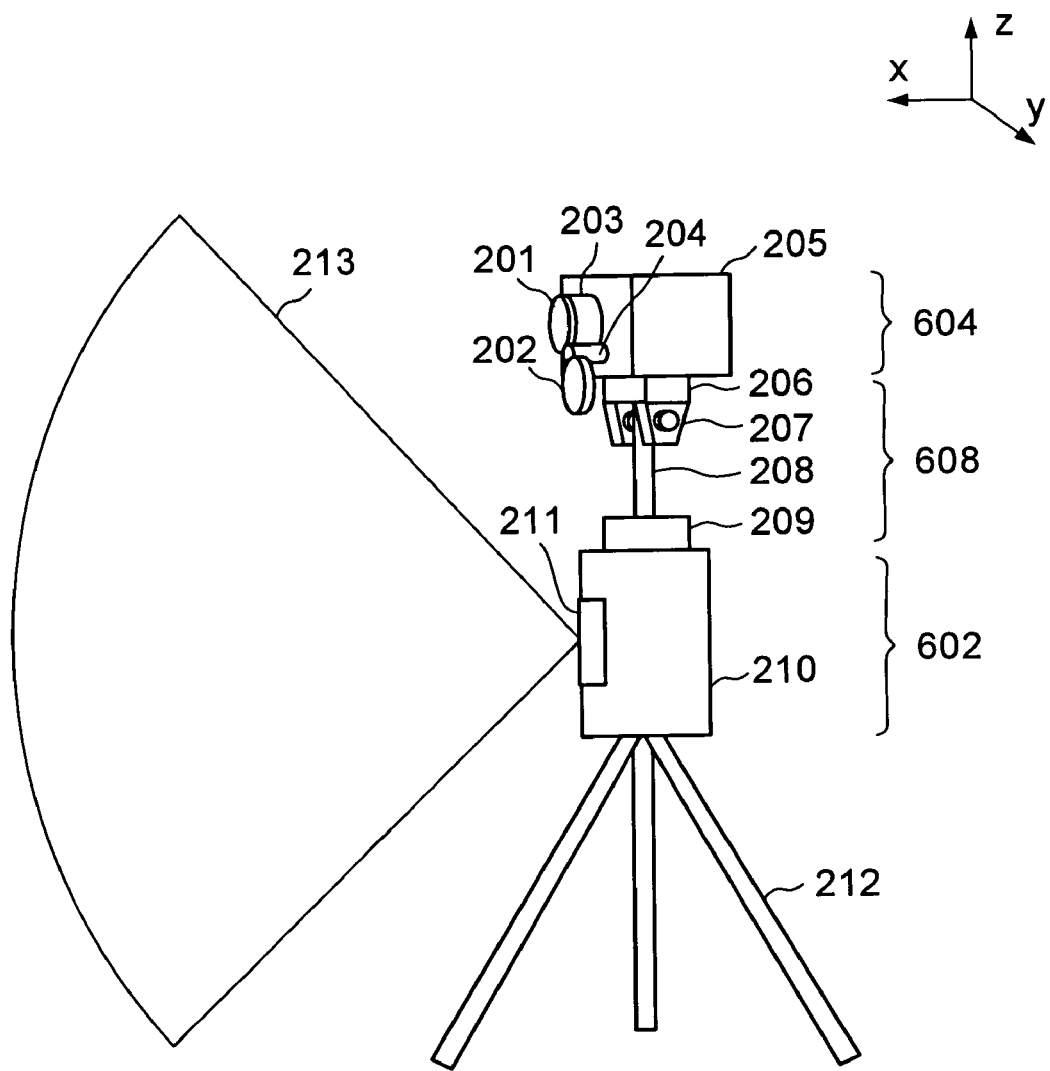
FIG. 5 is an external view of the image input device.

As shown in FIG. 5, the image input device according to this embodiment includes: a laser range finder 602 which uses invisible light to measure an orientation of an object and a distance to the object; a distance sensor pedestal 212 which rotatably retains the laser range finder 602; a camera 604 which measures a visible image containing an image of the object; and a camera movement mechanism which retains the camera 604 on a main body 210 of the laser range finder 602.

The laser range finder 602 includes a projector 211 which projects invisible light 213 and the sensor main body 210 which houses the projector 211 and the other integrated components therein. The laser range finder 602 controls the projector 211 to project the invisible light 213 onto an obstacle to measure a distance to the obstacle and an orientation of the obstacle.

The camera movement mechanism 608 includes: an XY-stage 206 which retains the camera 604 and moves the camera 604 in an xy-direction; a platform 207 which rotates the XY-stage 206 about a z-axis or a y-axis; a platform support 208 which moves the platform 207 in a z-direction; and a platform support base 209 which retains the platform support 208. With this configuration, the camera movement mechanism 608 can adjust the posture and the position of the camera 604 with respect to the laser range finder 602.

The camera 604 includes: a lens 203; two filters 201 and 202 (a visible light filter 201 which transmits the visible light while blocking the invisible light and an invisible light filter 202 which transmits the invisible light while blocking the visible light); a filter switching actuator 204 which rotates the two filters 201 and 202 to switch the filter which covers the lens 203; and a camera main body 205, to which the above-described components are attached and which houses the other integrated components therein.

In this embodiment, a stepping motor whose rotation angle can be controlled by a pulse wave is used as the filter switching actuator 204. The two filters 201 and 202 are attached to a tip of a rotation shaft of the stepping motor to be arranged symmetrically with respect to the rotation shaft of the stepping motor (so that one of the filters is attached at 180 degrees with respect to the other filter about the rotation shaft). After that, since the filters 201 and 202 rotate integrally at 180 degrees while keeping the positional relation between the filters 201 and 202 each time a pulse wave which rotates the rotation shaft at 180 degrees is applied to the stepping motor, the filter which covers the lens 203 of the camera 604 can be switched from the visible light filter 201 to the invisible light filter 202 or from the invisible light filter 202 to the visible light filter 201.

Although the stepping motor is used as the filter switching actuator 204 in this embodiment, a DC motor or an AC motor with encoder or an actuator which is expanded/contracted by an air pressure or an oil pressure may be used in place of the stepping motor. For example, when the motor with encoder is used as the filter switching actuator 204, it suffices that the rotation angle of the rotation shaft of the motor is controlled so that any one of the filters is located on the front side of the lens 203 of the camera 604 while the encoder is measuring the rotation of the shaft of the motor. As a result, the filter can be switched. When the actuator expanded and contracted by an air pressure or an oil pressure is used as the filter switching actuator 204, it suffices that the filters 201 and 202 are attached to the shaft of the actuator so that the positions of the two filters 201 and 202 can be respectively shifted from the front of the camera by the expansion or the contraction of the shaft of the actuator. As a result, the filter in front of the lens 203 of the camera 604 can be shifted.

Furthermore, in the image input device, there are provided, as shown in FIG. 10: a laser range finder control board 603 which controls the laser range finder 602; a camera control board 605 which controls the camera 604; a filter control board 607 which controls the filter switching actuator 204; the camera movement mechanism 608 including the platform 207; a platform control board 609 which controls the operation of the platform 207 and the like; a main memory 612 such as a memory; an auxiliary memory 611 such as a hard disk provided with a buffer area 618 which prestores various programs 613 to 617 and retains various data (a measurement value by the laser range finder 602, a measurement value by the camera 604, filter information indicating the type of filter currently attached to the lens, the processing result of each of the programs and the like); a main processor 601 which executes the program loaded from the auxiliary memory 611 on the main memory 612; a bus which connects the above-described components with each other; and the like.

The program group stored in the auxiliary memory 611 includes: an operating system 613 corresponding to a basic software which manages the execution of the program and the like; a calibration error verification program 615 that realizes processes in a calibration error verification mode (S110 and S150 of FIG. 1 described below), which verifies a calibration error; a calibration execution program 616 that realizes a process in a calibration execution mode (S130 of FIG. 1 described below), which calibrates a relative position and a relation posture between the camera and the laser range finder; a measurement execution program 617 that realizes a process in a measurement execution mode (S140 of FIG. 1 described below), which measures color information and distance information of an object; and a main program 614 which controls an overall flow of the processes.

Figure 9:
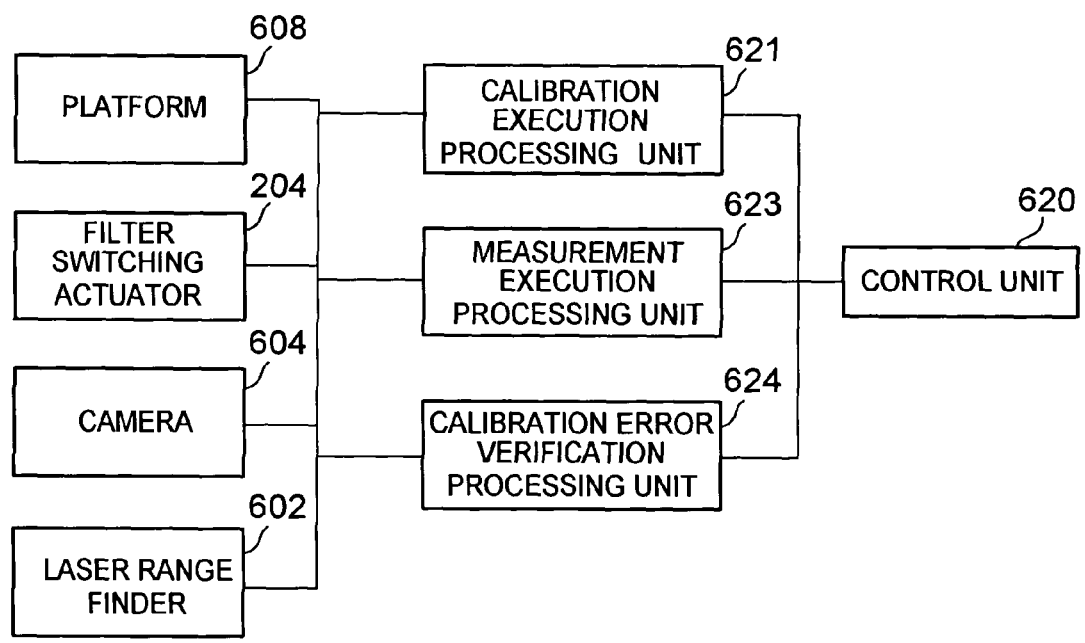
FIG. 9 is a functional configuration diagram of the image input device.

These programs are read on the main memory 612 and executed by the main processor 601. As a result, a functional configuration capable of appropriately and automatically calibrating relative position and posture (hereinafter, referred to as the relative position and the relative posture) between the laser range finder 602 and the camera 604 without using a special target and a special tool is realized. Specifically, as shown in FIG. 9, a calibration error verification processing unit 624 which executes the calibration error verification processes (S110 and S150); a calibration execution processing unit 621 which executes the calibration process (S130); a measurement execution processing unit 623 which executes a measurement process (S140) of the distance information and the color information; and a control unit 620 which controls the entire configuration are realized.

In the configuration as described above, the distance information and the color information of an object are independently measured by the laser range finder 602 and the camera 604 to calibrate the relative position and the relative posture between the laser range finder 602 and the camera 604 as needed. Hereinafter, such a process will be specifically described.

Figure 1:
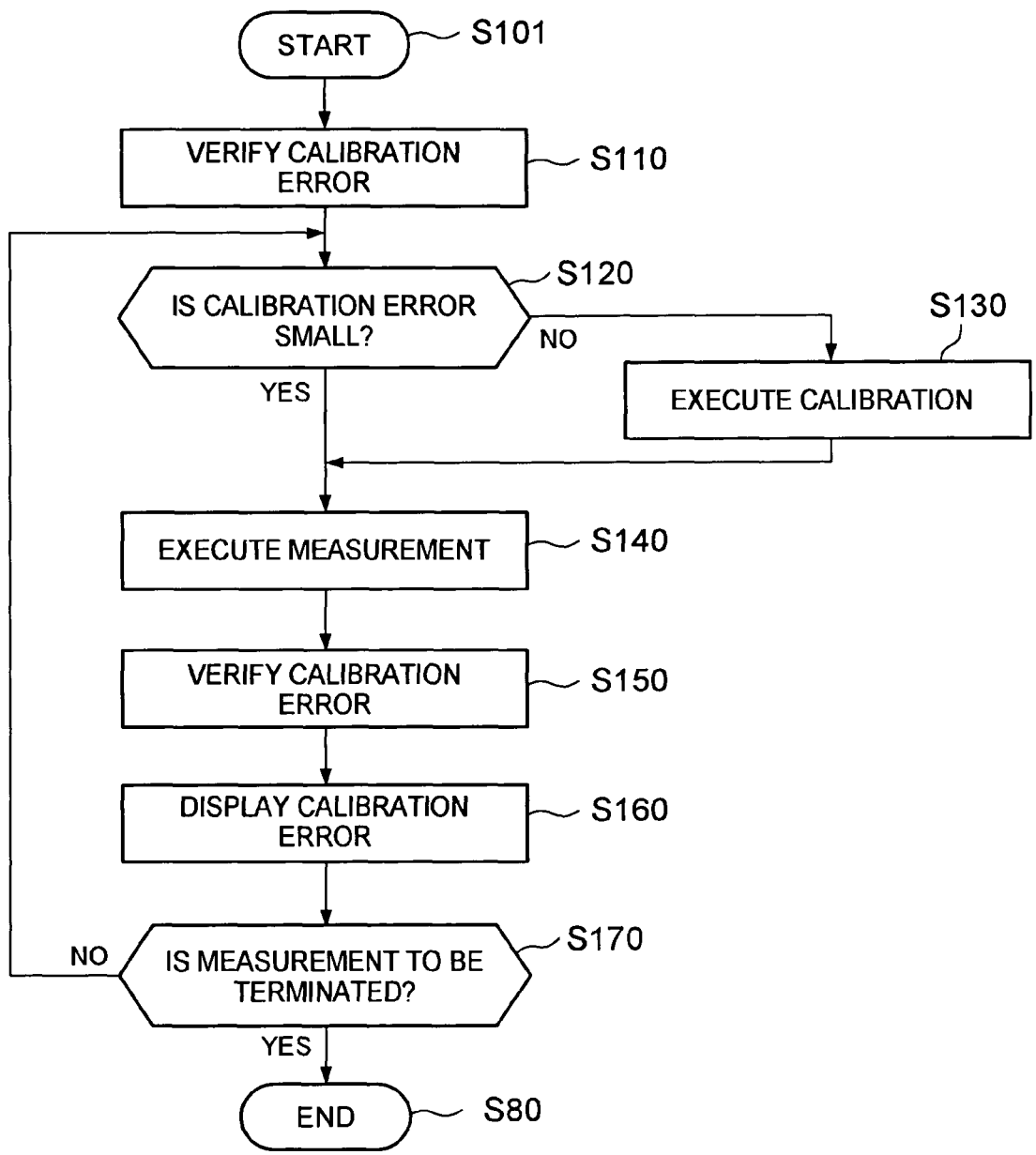
FIG. 1 is a view showing an overall flow of a process executed by an image input device according to an embodiment of the present invention.

FIG. 1 shows a schematic flowchart of the process executed by the image input device according to this embodiment.

This process includes processes in three modes as described below, that is, a process in the calibration verification mode S110 and S160, a process in the calibration execution mode S130, and a process in the measurement execution mode S140.

Upon activation of the main program 614 on the image input device (S101), the following process is executed by the control unit 620 realized by the activation of the main program 614. The control unit 620 first invokes the calibration error verification program 615 to execute the process in the calibration error verification mode S110.

The control unit 620 checks whether or not each of calibration errors obtained by the process is equal to or smaller than a threshold value (S120).

As a result, if all the calibration errors are equal to or smaller than the threshold value, the control unit 620 invokes the measurement execution program 617 to execute the process in the measurement execution mode S140. Upon completion of the process S140, the control unit 620 invokes the calibration error verification program 615 to execute the process in the calibration error verification mode S150 again. The calibration errors obtained by the process are displayed on a display to be presented to an operator (S160)

The operator refers to the display information (calibration errors) on the display to be able to judge whether or not the measurement is effective (S170). As a result, when it is judged that the measurement is effective, specifically, re-measurement is not required, the operator instructs the image input device to terminate the measurement. In response to the instruction, the entire program is terminated (S180). On the other hand, when it is judged that the measurement is not effective, specifically, re-measurement is required, the operator instructs the image input device to re-execute the process S120 and the subsequent processes. In response to the instruction, the process S120 and the subsequent processes are executed again.

On the other hand, if any of the calibration errors exceeds the threshold value, the control unit 620 invokes the calibration execution program 616 to execute the process in the calibration execution mode S130. After that, as in the case where the calibration errors are equal to or smaller than the threshold value, the process S140 and the subsequent processes is executed.

The process in each of the modes, which is included in the above process, will be further described.

(1) The calibration error verification mode (S120 and S150)

Since the content of the process S150 is the same as that of the other process S120, the description will be given in accordance with the flow of the process S120.

Figure 2:
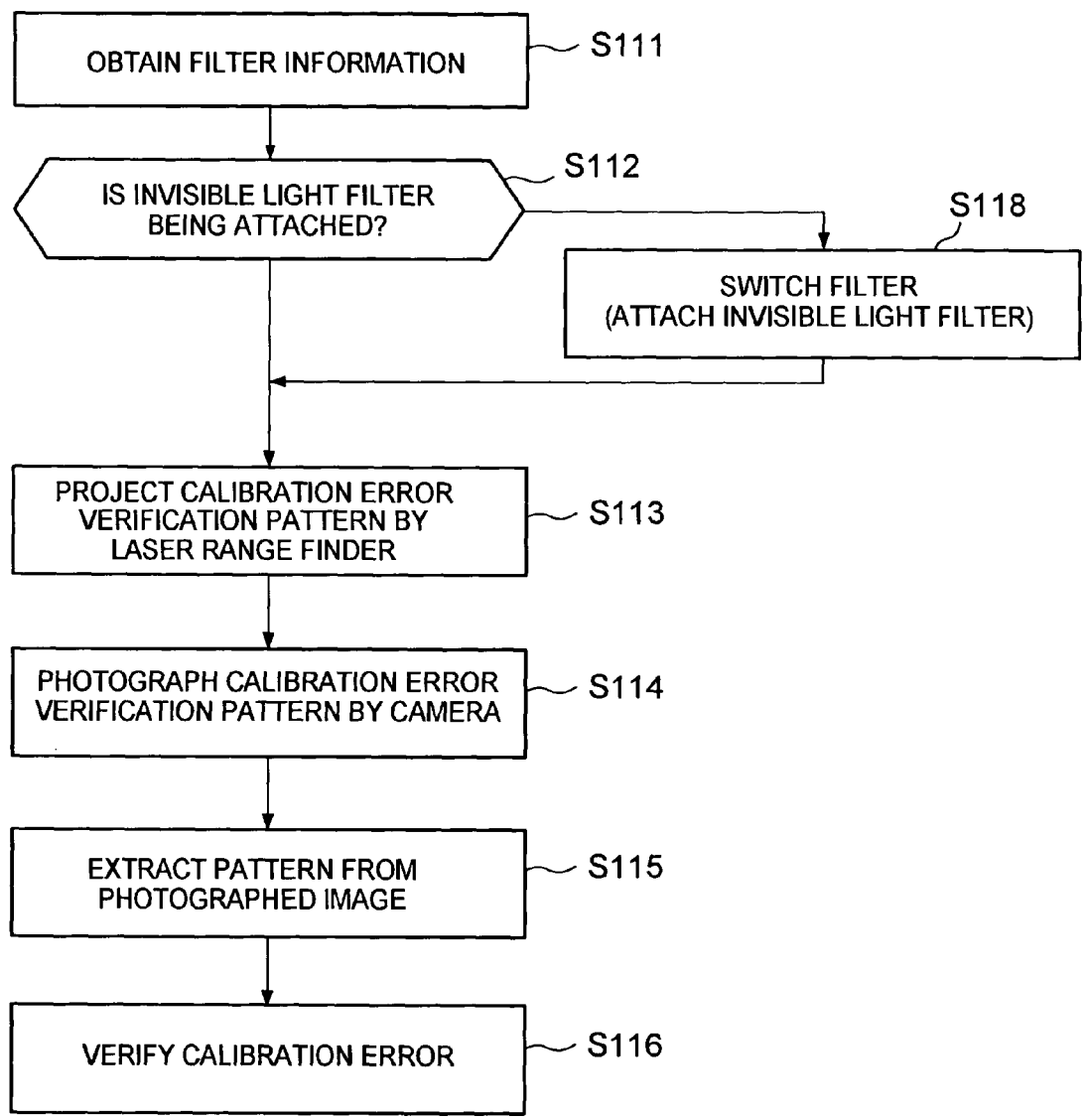
FIG. 2 is a flowchart of a process in a calibration error verification mode.

The calibration error verification processing unit 624 realized by invoking the calibration error verification program 615 executes the following processes (S111 to S118) shown in FIG. 2.

The calibration error verification processing unit 624 obtains filter information indicating the type of filter attached on the front side of the lens 203 of the camera 604 (S111) and judges the type of filter based on the obtained filter information (S112).

As a result, if the invisible light filter 202 is attached to the lens 203 (if the camera 604 is capable of photographing the invisible light from the projector 211 of the laser range finder 602), the calibration error verification processing unit 624 controls the laser range finder 602 through the laser range finder control board 205 to make the projector 211 project the invisible light (S113). As a result, the invisible light is projected onto the object to form a calibration error verification pattern on a surface (plane) of the object.

In this embodiment, as the calibration error verification pattern, a pattern composed of three spot light beams that are not located on one straight line (hereinafter, referred to as a spot pattern) is used. The calibration error verification pattern is formed by simultaneously projecting a plurality of spot light beams from the projector 211 or by sequentially projecting a spot light beam from the projector 211 during the rotation of the platform. Although the spot pattern composed of three spots is used as the calibration error verification pattern in this embodiment, the calibration error verification pattern is not limited to the spot pattern composed of three spots. The calibration error verification pattern may be a spot pattern composed of four spots or more, a plurality of straight line patterns, a plurality of circular or rectangular patterns, a pattern composed of spots arranged in a lattice or the like.

Next, the calibration error verification processing unit 624 controls the camera 205 through the camera control board 205 to photograph the projected three calibration error verification patterns. The calibration error verification processing unit 624 records the obtained image in the buffer area 618 (S114). Then, the calibration error verification processing unit 624 performs a binarizing process on the image recorded at this time and extracts the calibration error verification patterns by the calculation of a center of gravity of the area extracted by the binarizing process. Furthermore, the calibration error verification processing unit 624 records the pattern image extracted at this time, along with date/time information indicating the current date and time, in the buffer area 618 (S115).

The calibration error verification processing unit 624 compares the extracted pattern images and a reference pattern image. In this embodiment, used as the reference pattern image is a corresponding pattern image recorded along with the date/time information indicating the completion date and time of the previous calibration (a corresponding pattern image ultimately obtained during the previous calibration, that is, a corresponding pattern image recorded when the relative position and the relation posture are adjusted to appropriate ones) is used. By the comparison between the pattern images, a distance between the pattern images is calculated as a calibration error to be used for the comparison process with the threshold value (S120 described above) or the display process (S160 described above) (S116).

Figure 6:
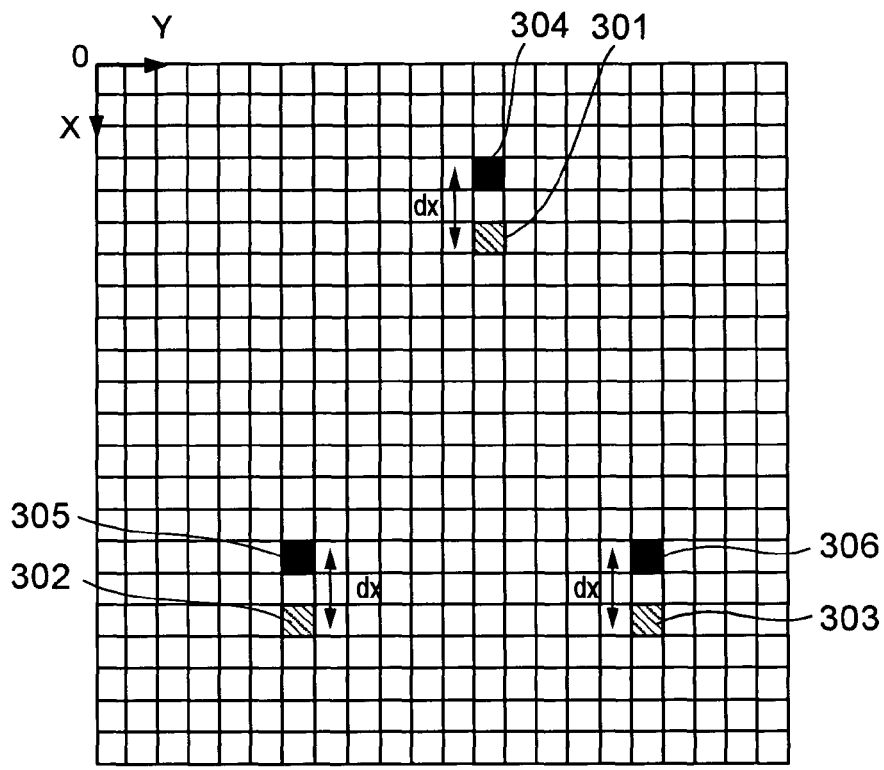
FIG. 6 is a view showing a calibration error verification pattern image, which is photographed by a camera of the image input device, and a reference pattern image.

For example, FIG. 6 shows calibration error verification pattern images 304 to 306 obtained when the camera platform support 208, on which the camera is mounted, is brought slightly down by a mechanical play or the like and calibration pattern images (calibration pattern images when the relative position and the relative posture are adjusted to appropriate ones) 301 to 303 ultimately obtained by the previous calibration. In FIG. 6, a distance dX between the new pattern images 304 to 306 and the patterns 301 to 303 are calculated as calibration errors. Those calibration errors are compared with the threshold value in Step S120 described above or are displayed in Step S160 described above.

FIG. 6 shows a displacement in an X-direction, which is generated between the calibration error verification pattern images 304 to 306 obtained when the camera platform support 208, on which the camera is mounted, is brought slightly down by a mechanical play or the like, and the reference pattern images 301 to 303. However, depending on a change in relative position and relative posture between the laser range finder 602 and the camera 604, not only a displacement in the X-direction but also a displacement in a Y-direction or in a rotational direction (for example, a displacement in a rotational direction about a point O) may be generated between the calibration error verification pattern images 304 to 306 and the reference pattern images 301 to 303. In such a case, it suffices that not only the X-direction distance dX between the pattern images but also a Y-direction distance dY between the pattern images and the like may be calculated as the calibration error.

On the other hand, in Step S112, if it is judged that a filter other than the invisible light filter 202 (that is, the visible light filter 201) is attached to the lens 203 (the camera 604 is not capable of photographing the invisible light from the projector 211), the calibration error verification processing unit 624 controls the filter switching actuator 204 through the filter control board 207 to switch the filter on the front side of the lens 203 from the visible light filter 201 to the invisible light filter 202 (S118). Specifically, a pulse wave which instructs the rotation by 180 degrees is transmitted to the filter switching actuator 204 to rotate the rotation shaft of the filter switching actuator 204 by 180 degrees. As a result, the two filters 201 and 202 are rotated by 180 degrees to cover the lens 203 of the camera 604 with the invisible light filter 202. After that, the camera 604 is brought into a state where the camera 604 is capable of photographing the invisible light from the projector 211 as a visible image. After that, the filter information in the auxiliary memory 611 is rewritten with information indicating the invisible light filter.

After that, the calibration error verification processing unit 624 executes the process S105 and the subsequent process as in the case where it is judged that the invisible light filter 202 is attached to the lens 203. As a result, a calibration error used in the comparison process with respect to the threshold value (S120 described above) or the display process (S160 described above) is obtained.

(2) The process in the measurement execution mode (S140)

Figure 3:
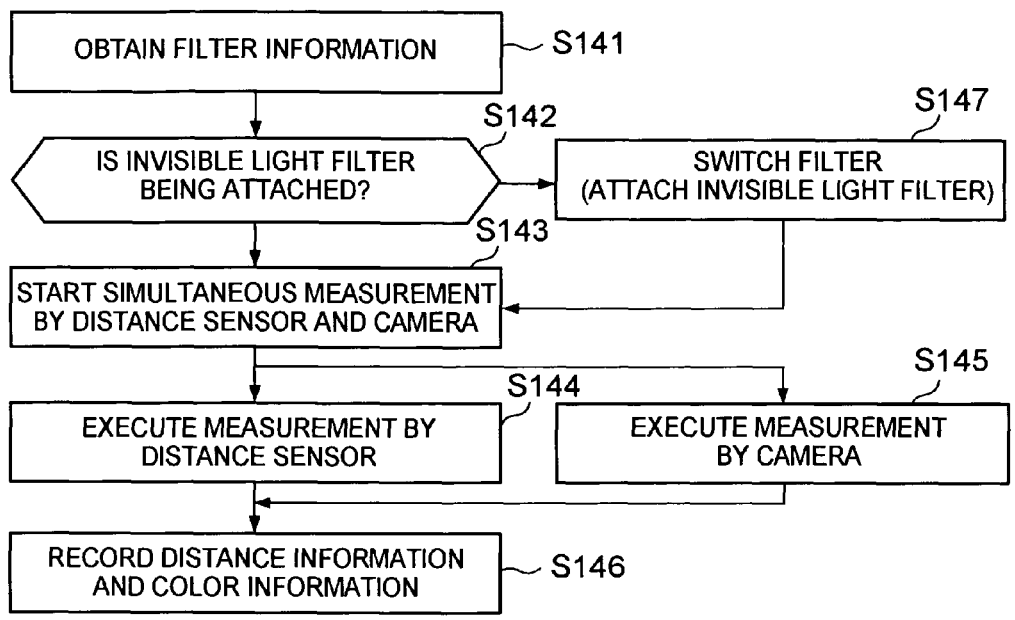
FIG. 3 is a flowchart of a process in a measurement execution mode.

As described above, upon completion of the process S110 in the calibration error verification mode, the comparison process between each of the calibration errors and the threshold value (S120) is performed. If all the calibration values are equal to or smaller than the threshold value, the measurement execution program 617 is invoked. The measurement execution processing unit 623 realized by the measurement execution program 617 executes processes (S141 to S147) shown in FIG. 3 as described below.

The measurement execution processing unit 623 obtains the filter information indicating the type of filter attached to the lens 203 of the camera 604 (S141) and judges the type of filter currently attached to the lens 203 of the camera 604 based on the obtained filter information (S142).

As a result, if the visible light filter 201 is attached to the lens 203 of the camera 604 (if the camera 604 is not capable of photographing the invisible light from the projector), the measurement execution processing unit 623 transmits a SYNC signal to the laser range finder 602 and the camera 604 to start simultaneous measurement with the laser range finder 602 and the camera 604 (S143).

As a result, the measurement of the distance to the object and the orientation of the object by the laser range finder 602 (S144) and the measurement of the color information by the camera 604 (S145) are performed in parallel. The color information (R, G, and B), the distance information Z, and the orientation information of the object obtained by the simultaneous measurement are recorded in the buffer area 618 of the auxiliary memory 611 (S146).

Figure 7:
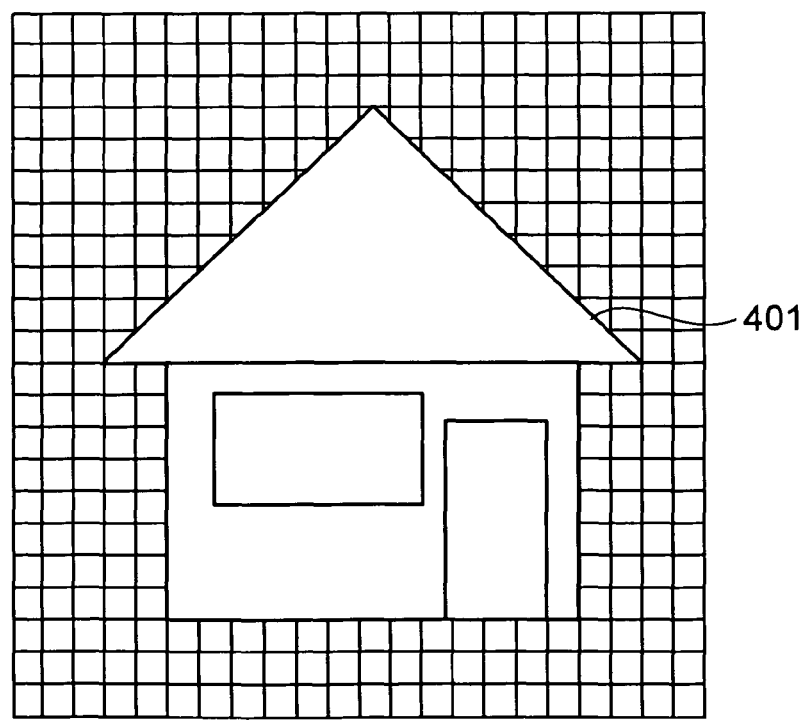
FIG. 7 is a view showing an exemplary image of an object, which is photographed by the camera of the image input device.
Figure 8:
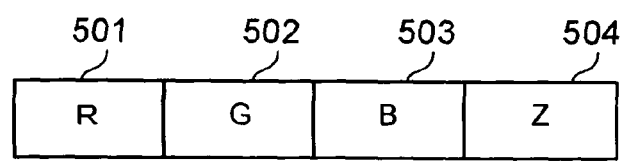
FIG. 8 is a view showing a format of results of measurement performed by the image input device.

For example, the laser range finder main body 210 is rotated while the invisible light 213 from the projector 211 of the laser range finder 602 is being scanned in a vertical direction (z-direction of FIG. 5) without changing the orientation of the camera 604. Meanwhile, the distance information Z to the object within a field of view of the camera 604 and the orientation information of the object are measured by the laser range finder 602, while the color information (R, G, and B) of the object is measured by the camera 604. The color information and the distance information obtained by the measurement are recorded in the buffer area 618 of the auxiliary memory 611, for example, as image data of an object image 401 as shown in FIG. 7. A format of the image data is shown in FIG. 8. The image data contains the color information (R, G, and B) 501 to 503, the distance information (Z) 504 and the orientation information (not shown) for each pixel.

On the other hand, when the invisible light filter 202 is attached to the lens 203 of the camera 604, the measurement execution processing unit 623 controls the filter switching actuator 204 through the filter control board 207 to switch the filter on the front side of the lens 203 from the invisible light filter 202 to the visible light filter 201 (S147). Specifically, a pulse wave which instructs the rotation by 180 degrees is applied to the filter switching actuator 204 to rotate the rotation shaft of the filter switching actuator 204 by 180 degrees. As a result, since the visible filter 201 is situated on the front side of the lens 203 of the camera 604, the camera 604 is brought into a state where the camera 604 is not capable of photographing the invisible light from the projector 211.

After that, the measurement execution processing unit 623 rewrites the filter information in the auxiliary memory 611 with the information indicating the visible light filter to execute the process S118 and the subsequent processes. As a result, the above-described image data (see FIG. 8) containing the color information (R, G, and B), the distance information Z, and the like of the object is obtained. The obtained image data is recorded in the buffer area 618 of the auxiliary memory 611.

Upon termination of the above process, the control unit 620 displays the calibration errors after the execution of the process in the calibration error verification mode (S150) as described above and then executes a process in response to an instruction of the operator. The process S150 is the same as the process S110 as described above.

(3) The process in the measurement execution mode (S130)

Figure 4:
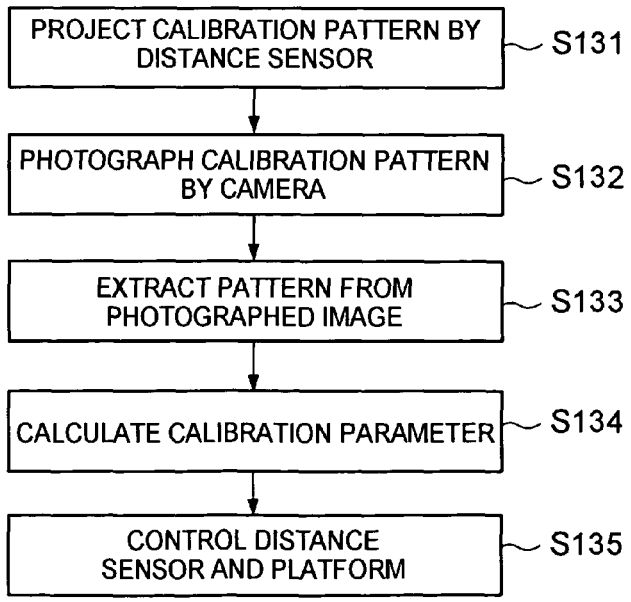
FIG. 4 is a flowchart of a process in a calibration mode.

As described above, upon completion of the process in the calibration error verification mode (S110), the comparison process between each of the calibration errors and the threshold value (S120) is performed. If all the calibration values are equal to or larger than the threshold value, the calibration execution program 616 is invoked. The calibration execution processing unit 621 realized by the calibration execution program 616 executes processes (S131 to S135) shown in FIG. 4 as described below.

The calibration execution processing unit 621 controls the laser range finder 204 through the laser range finder control board 205 to make the projector 211 project the invisible light onto the object. As a result, a pattern similar to the calibration error verification pattern is formed as the calibration pattern on the surface of the object (S131). Since the spot pattern composed of three spots is used as the calibration error verification pattern in this case, a spot pattern composed of three spots is used as the calibration pattern. However, if another pattern (for example, as described above, a spot pattern composed of four or more spots that are not situated on the same straight line or the like, a plurality of straight light patterns, a plurality of circular or rectangular patterns, or a lattice pattern) is used as the calibration error verification pattern, another pattern similar to the calibration error verification pattern is used as the calibration pattern.

Further, the calibration execution processing unit 621 controls the camera 206 through the camera control board 207 to photograph the projected calibration error verification pattern (S132).

The calibration execution processing unit 621 extracts a calibration pattern image from the image obtained by photographing in the process similar to the process S115 described above (S133) and then calculates calibration parameters indicating the current relative position and the current relative posture between the laser range finder 602 and the camera 604 based on the result of extraction (S134) For example, by using an existing calibration technique such as a Tsai calibration technique, the values indicating the relative position and the relative posture of the camera 604 with respect to the laser range finder 602 are calculated as the calibration parameters.

The calibration execution processing unit 621 controls the platform 207 and the like through the platform control board 209 so that the calculated calibration parameters become values indicating predetermined relative position and relative posture (S135). As a result, the relative position and the relative posture between the laser range finder 602 and the camera 604 are adjusted.

For example, if a target value of the calibration parameter is set, differences between the sequentially obtained calibration parameters and the target value are calculated. The position in a xy-plane is adjusted by a translational motion caused by driving the XY-stage 206, the posture is adjusted by the rotation of the platform 207, and the height is adjusted by the expansion and contraction of the camera platform support 208 so that the differences become smaller (become closer to 0). As a result, the relative position and the relative posture of the camera 604 with respect to the laser range finder 602 can be adjusted to appropriate relative position and relative posture.

When the laser range finder 602 and the camera 604 are located to have the appropriate relative position and relative posture in the above-described manner, the control unit 620 executes the process in the measurement execution mode described above (S140) as described above.

By the above-described process, only by switching between the visible light filter and the invisible light filter on the front side of the lens of the camera, the camera is capable of photographing the visible light as a visible image in normal measurement, while in the calibration error verification or the calibration, the camera is capable of photographing the invisible light from the laser range finder as a visible image. After that, the invisible light from the laser range finder can be used for detecting a calibration error or for calibration even without using special equipment. Moreover, in the calibration error verification or the calibration, the operator can visually recognize the position of a pattern formed by the invisible light from the laser range finder as the position of the visible image. Accordingly, the operation is facilitated.

Furthermore, the calibration is detected not only upon activation of the program but also at an appropriate timing to judge whether or not the calibration is required based on the result of the measurement of the calibration error. In accordance with the result of judgment, the calibration using the invisible light from the laser range finder is automatically executed. As described above, when the calibration is judged to be required based on the result of measurement of the calibration error, that is, at an appropriate timing, the laser range finder and the camera can be automatically calibrated.

Although the filter enabling the observation of the invisible light is attached on the side of the camera in this embodiment, for example, a filter which converts the invisible light into the visible light may be attached on the side of the projector of the laser range finder. Even in such a manner, the camera can measure the light from the projector as a visible image. Accordingly, the same result as that described above can be obtained.

Although the programs 615 to 617 which realize the respective functions of the modes are prestored in the auxiliary memory 611 of the image input device in this embodiment, the programs 615 to 617 are not necessarily required to be prestored in the auxiliary memory 611. For example, the programs 615 to 617 may be loaded from a recording medium which stores the programs 615 to 617, onto the main memory 612 to be executed by the main processor 601.

Since the image input device, which automatically calibrates the distance sensor and the camera, enables the calculation of a color in each of the pixels of an image and a distance to an object corresponding to the pixels, the present invention can be used in the field which requires information indicating a geographic relation between distance information and color information, for example, in the recognition of an object required for an autonomous operation of a robot, the creation of an environmental map, and the creation of a CG model of a building.

According to the present invention, in the image input device including the laser range finder and the camera, the laser range finder and the camera can be automatically calibrated at an appropriate timing without using special equipment.

What is claimed is:

1. An image input device, comprising:
a laser range finder which measures distance information of an object by using invisible light;
a camera which measures color information of the object;
filter attachment means which comprises a first filter which transmits visible light and blocks invisible light and a second filter which transmits invisible light and blocks visible light, to be attachable to the camera;
calibration error verification means which calculates a calibration error between the laser range finder and the camera by comparison between an image which has a pattern of the invisible light projected from the laser range finder onto the object and is photographed by the camera to which the first filter is being attached, and a reference image;
calibration means which calibrates a relative position and a relative posture between the laser range finder and the camera when the calibration error exceeds a predetermined value; and
measurement means which records the color information obtained by the camera and the distance information obtained by the laser range finder during an acquisition of the color information, as an image data; wherein:
the reference image is the pattern of the invisible light that is projected from the laser range finder onto the plane of the object and photographed of a previous calibration by the camera to which the first filter is attached;
the filter attachment means switches the filter attached to the camera from the first filter to the second filter in one of a case where calibration by the calibration means is terminated and a case where the calibration error is equal to or smaller than the predetermined value; and
the measurement means, after the filter attached to the camera is switched form the first filter to the second filter, records the color information obtained by the camera to which the second filter is attached and the distance information obtained by the laser range finder concurrently with acquisition of the color information, as the image data.

2. An image input device according to claim 1, wherein the calibration error verification means calculates the calibration error based on a distance between the image which has the pattern of the invisible light and is photographed by the camera to which the first filter is attached, and the reference image.

3. An image input device according to claim 1, wherein the filter attachment means attaches the first filter to the camera at least one of a timing prior to start of the measurement of the distance information and the color information and each measurement of the distance information and the color information, and the calibration error verification means calculates a calibration error between the laser range finder and the camera.

4. An image input device according to claim 1, wherein the pattern of the invisible light is any pattern of a spot pattern composed of at least three spots that are not situated on the same straight line, a plurality of straight light patterns, a plurality of circular or rectangular patterns, or a lattice pattern.

5. An image input device according to claim 1, further comprising a control unit configured to control the filter attachment means, the calibration error verification means, the calibration means and the measurement means, such that the reference image is the pattern of the invisible light that is projected from the laser range finder onto the plane of the object and photographed of the previous calibration by the camera to which the first filter is attached, the filter attachment means switches the filter attached to the camera from the first filter to the second filter in one of a case where calibration by the calibration means is terminated and a case where the calibration error is equal to or smaller than the predetermined value, and the measurement means, after the filter attached to the camera is switched from the first filter to the second filter, records the color information obtained by the camera to which the second filter is attached and the distance information obtained by the laser range finder concurrently with acquisition of the color information, as the image data.

6. A calibration method which calibrates a relative position and a relative posture between a laser range finder and a camera in an image input device, the image input device comprising:

the laser range finder which measures distance information of an object by using invisible light;

a camera which measures color information of the object;

an adjustment mechanism which changes the relative position and the relative posture between the laser range finder and the camera;

filter attachment means which comprises a first filter which transmits visible light and blocks invisible light and a second filter which transmits invisible light and blocks visible light, to be attachable to the camera; and calculation means, wherein the calibration method executes the steps of:

attaching the first filter to the camera by the filter attachment means;

comparing, by the calculation means, an image which has a pattern of the invisible light projected from the laser range finder onto the object and is photographed by the camera to which the first filter being attached, and a reference image to calculate a calibration error between the laser range finder and the camera;

controlling, by the calculation means, the adjustment mechanism to calibrate the relative position and the relative posture between the laser range finder and the camera when the calibration error exceeds a predetermined value; and switching, by the filter attachment means, the filter attached to the camera from the first filter to the second filter in one of a case where calibration by the calibration means is terminated and a case where the calibration error is equal to or smaller than the predetermined value; and the reference image is a pattern of the invisible light that is projected from the laser range finder onto the plane of the object and photographed at the time of a previous calibration by the camera to which the first filter is attached.

* * * * *